US005564175A

United States Patent [19]

Nejad

[11] Patent Number: 5,564,175

[45] Date of Patent: Oct. 15, 1996

[54] O-RING REMOVER TOOL

[75] Inventor: Saeed Nejad, Los Gatos, Calif.

[73] Assignee: Advanced Micro Devices, Inc., Sunnyvale, Calif.

[21] Appl. No.: 371,712

[22] Filed: Jan. 12, 1995

[51] Int. Cl.[6] .......... B23P 19/04

[52] U.S. Cl. .......... 29/235; 29/267

[58] Field of Search .......... 254/25, 28, 131; 81/8.1, 3.55, 488; 29/235, 239, 267, 426.6, 270, 278, 451

[56] References Cited

U.S. PATENT DOCUMENTS

| | | | |
|---|---|---|---|
| 450,922 | 4/1891 | Truman | 254/28 |
| 532,557 | 1/1895 | Hoffman | 81/8.1 |
| 2,375,942 | 5/1945 | Palmer | 254/28 |
| 2,964,763 | 12/1960 | Nagy et al. | 81/3.55 |
| 3,145,463 | 8/1964 | Hockett | 29/235 |
| 3,290,967 | 12/1966 | Stark | 81/3.55 |
| 3,380,092 | 4/1968 | Golczynski | 254/25 |
| 3,508,319 | 4/1970 | Boyer | 29/235 |
| 3,861,248 | 1/1975 | Bushinsky | 81/8.1 |
| 4,185,371 | 1/1980 | Barnett | 29/235 |
| 4,216,685 | 8/1980 | Taylor | 81/3.55 |
| 4,649,618 | 3/1987 | Harrison | 29/235 |
| 4,777,849 | 10/1988 | Sears | 81/8.1 |
| 4,813,120 | 3/1989 | Fournier | 29/235 |
| 5,075,945 | 12/1991 | Krzecki | 29/235 |

FOREIGN PATENT DOCUMENTS

| | | | |
|---|---|---|---|
| 69301 | 6/1945 | Norway | 81/3.55 |

*Primary Examiner*—Robert C. Watson
*Attorney, Agent, or Firm*—Davis Chin

[57] ABSTRACT

A tool for use in removing an O-ring seal member from a grooved surface includes an elongated handle portion (12) and a head portion (14) having a rounded tip portion (22). The tip portion is insertable into the grooved surface and underneath the O-ring seal member so as to pry manually and lift upwardly the same in order to remove the O-ring seal member.

5 Claims, 3 Drawing Sheets

O-RING REMOVER TOOL

BACKGROUND OF THE INVENTION

This invention relates generally to hand tools and more particularly, it relates to a tool which is adapted to be used for removing safely O-rings from various types of process equipment.

As is generally known in the art, O-rings are used typically to provide a fluid-tight or gas-tight seal between two surfaces. For example, O-rings are generally placed around the circumference of a groove or the like so as to insure a sealing engagement between the surface of the groove and an abutting surface. It is quite frequent that these O-rings become possibly damaged or even destroyed during use and thus are required to be changed. On the other hand, there are times when it is only desired to check or inspect the O-rings to determine whether or not they need to be replaced.

However, it is unknown to the inventor of such existing tools which are commercially available that could be used for removing of O-rings from a piece of equipment. In view of the absence of such tools, a user will typically grab any convenient tool or instrument and use it for removing the desired O-ring. These tools or instruments may be of any shape and size and can the full gamut from metal needles, pins, screw drivers, or any available objects which have a sharp tip. Because these tools are generally formed of a metallic material, when they are inserted underneath the O-ring and in between the O-ring and the outer surface of the groove so as to pry or lift off the O-ring, the fine smooth surface of the groove may become scratched or scraped. As a result, the integrity of the seal/vacuum is compromised and may further cause a number of undesired conditions, such as poor quality processes, lower yields, high leakage rates and excessive down-times of the equipment.

Moreover, these prior art tools used have another disadvantage in that they may actually dig into the O-ring as well and can cause damage to it or even possibly destroy the same (i.e., splitting or ripping the O-ring). In view of the fact that some of these O-rings used in process equipment are sometimes quite expensive, the use of such conventional tools can be a costly proposition. As can be easily seen, this cost would be rather substantial in nature when dealing with a particular piece of process equipment which involves the removal of a large number of O-rings.

It would therefore be desirable to provide a tool which is adapted to be used for removing O-rings from various types of equipment without causing damage to the equipment and/or the O-ring itself.

SUMMARY OF THE INVENTION

Accordingly, it is a general object of the present invention to provide a tool which is adapted to be used for removing O-rings from various types of equipment which is relatively simple in its construction and is relatively easy and inexpensive to manufacture.

It is an object of the present invention to provide a tool for use in removing O-rings more efficiently and effectively than the instruments used in the prior art.

It is another object of the present invention to provide a tool for use in removing an O-ring which includes an elongated handle portion and a head portion having a tip end.

In accordance with these aims and objectives, the present invention is concerned with the provision of a tool for use in removing an O-ring seal member from a grooved surface. The tool includes an elongated handle portion and a head portion. The handle portion has a first end and a second end. The first end of the handle portion is of a sufficient length so as to be gripped by a user.

The head portion has a first end formed integrally with the second end of the handle portion and a second end terminating in a round tip portion. The tip portion is insertable into the grooved surface and underneath the O-ring seal member so as to pry manually and lift upwardly the same in order to remove the O-ring seal member.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

Figure 1:
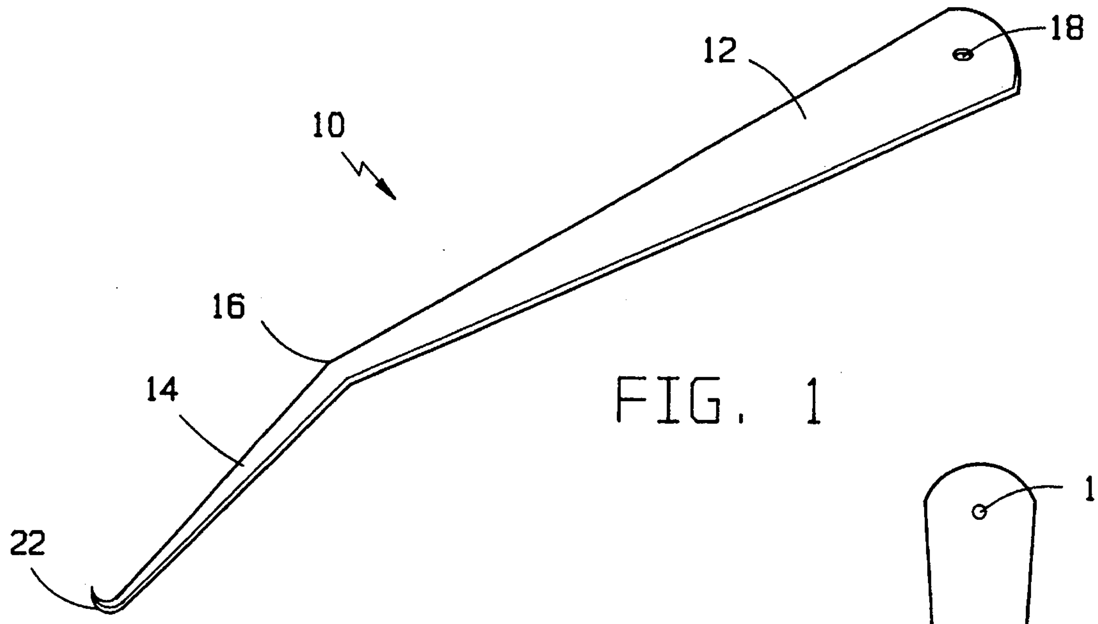
FIG. 1 is a perspective view of the tool for removing O-rings, constructed in accordance with the principles of the present invention.
Figure 2:
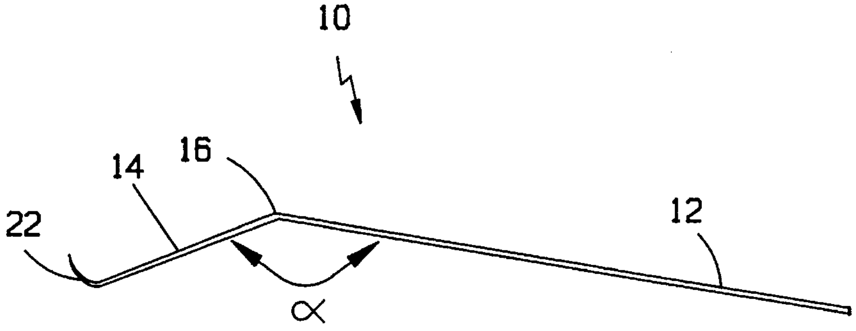
FIG. 2 is a side elevational view of the tool of FIG. 1.
Figure 3:
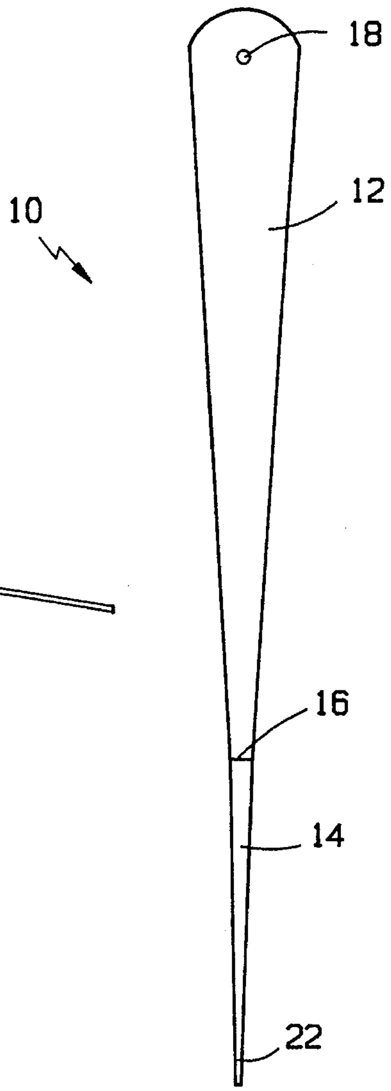
FIG. 3 is a top plan view of the tool of FIG. 1.

Referring now in detail to the various views of the drawings, there is shown in FIGS. 1–3 a tool designated generally by reference numeral 10 and constructed in accordance with the principles of the present invention. The tool 10 is adapted to be used for removing safely O-ring seal members from various types of chemical process equipment and the like. The tool 10 includes a relatively flat, elongated handle portion 12 and a head portion 14 which is formed integrally at distal end 16 of the handle portion 12.

The tool 10 is preferably made of a low-weight plastic material formed by a conventional injection molding process. The handle portion 12 has a configuration as illustrated and is sized so as to be grasped easily by the user of the tool. As can be seen, the handle portion 12 has a substantially rectangular cross-section and is tapered inwardly from its free end to the distal end 16. Adjacent the free end, an opening or aperture 18 is formed in the handle portion 12 which facilitates carrying of the tool on a key chain or the like. The portion 16 is disposed with respect to the handle portion 12 at an angle $\alpha$, approximately 120° to 150°

(preferably at 135°) so as to facilitate removing of an O-ring 20 as discussed below in relation to FIG. 4.

In a model built for demonstration of the invention, the tool was approximately 5 inches in overall length with the handle portion 12 being about 4 inches and the head portion 14 being about 1 inch. However, the length of the handle portion 12 can range from 2–6 inches and the length of head portion 14 can range from 0.5 to 1.5 inches. The handle portion 12 is tapered over its length to a width of about ⅛ inch at the distal end 16 and has a thickness in the range of 0.125 to 0.25 inch. Further, the head portion 14 is likewise tapered over its length to a width of about 0.062 inch at tip end 22. The thickness of the head portion 14 can also range from 0.125 to 0.25 inch. It will be noted that the tip end 22 is preferably bent upwardly about 30° as shown in FIG. 2 so as to facilitate insertion of the tool underneath the O-ring to be removed. The tip end 22 is designed to be not too sharp but rather rounded in shape so as to prevent damage to the equipment and/or O-ring.

Figure 4:
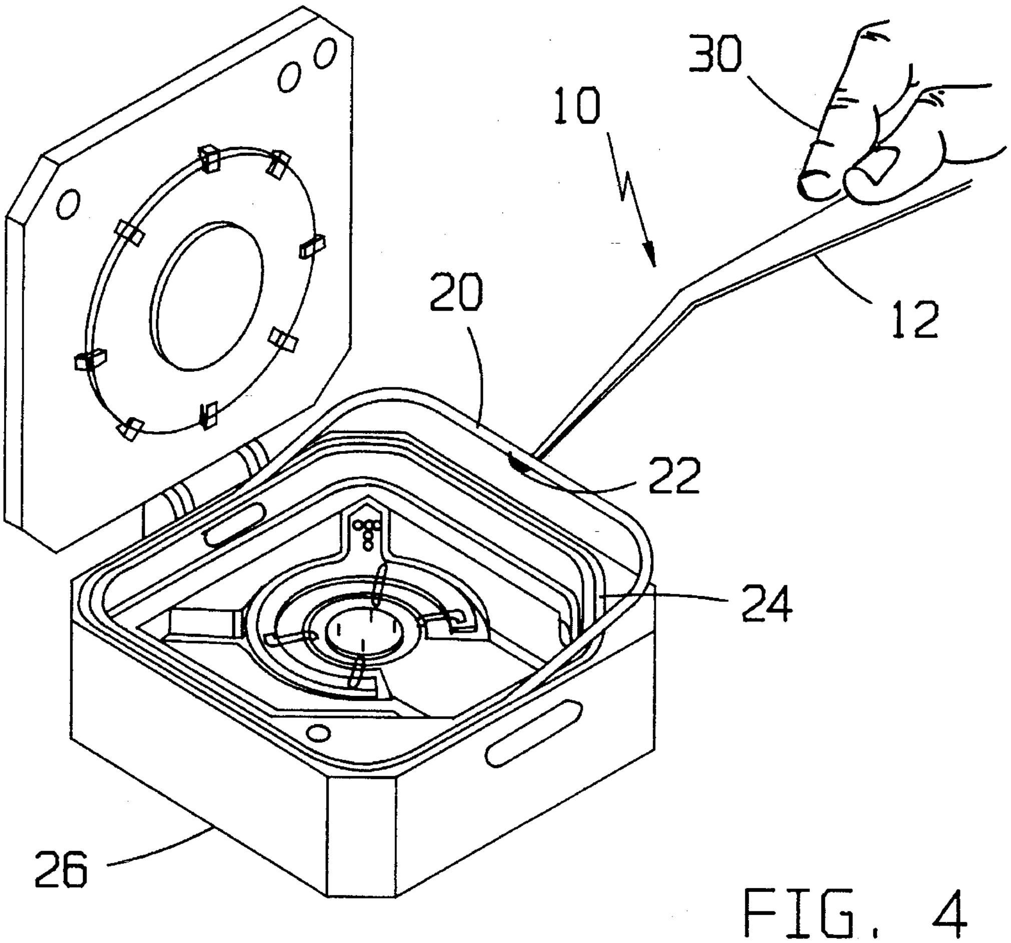
FIG. 4 is a diagrammatical view, illustrating the removal of an O-ring from a process equipment with the tool of FIG. 1.

Referring now to FIG. 4, there is illustrated how the tool 10 of the present invention may be used to facilitate the safe removal of the O-ring 20 from a grooved surface 24 formed in the housing body 26 of a CVD process chamber 28. Since the housing body 26 is generally made of a metallic material such as aluminum, the use of the aforementioned conventional instruments of the prior art can cause scratches or nicks in the grooved surface 24 as well as other damage to the O-ring 20 itself. If a user is in possession of a tool 10 of the present invention, he could grasp the handle portion 12 with his fingers 30 as shown in FIG. 4 with the tip end 22 of the head portion 14 inserted into the grooved surface 24 and underneath the O-ring 20. It should be clearly understood that the user can grip anywhere along the handle portion 12 so long as he maintains control over the tip end 22. Then, the user can pry manually the O-ring 20 from the grooved surface 24 and lift the same upwardly in order to remove the O-ring. Since the tool 10 is made of a plastic material, it will not tend to scratch or otherwise harm the grooved surface 24 on the housing body 26 and/or the O-ring 20 itself.

Figure 5:
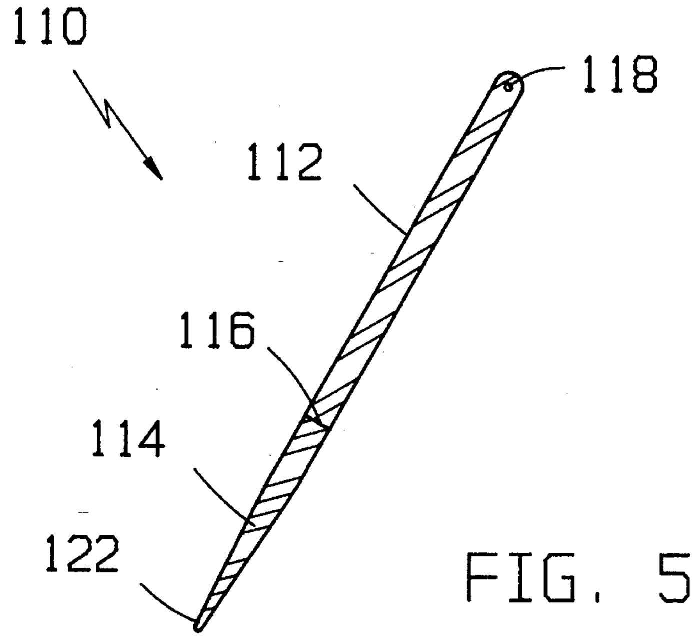
FIG. 5 is a perspective view of a second embodiment in accordance with the principles of the present invention.

FIG. 5 shows a second embodiment of the tool 110 of the present invention which is comprised of an elongated, cylindrically-shaped handle portion 112 and a tapering conical head portion 114. The overall dimension of this embodiment is substantially the same as the prior embodiment. In particular, the handle portion 112 is about 4 inches in length and has a diameter of approximately ¼ inch. The free end of the handle portion 112 is similarly provided with an opening 118 which facilitates the carrying of the same. The distal end 116 of the handle portion 112 is formed integrally with the head portion 114. The head portion 114 is about 1.5 inches in length and is tapered along its length from the distal end 116 to a tip end 122. Again, the tip end 122 is formed generally in a rounded shape so as to prevent damage to the equipment and/or O-ring to be removed.

Both the handle portion 112 and the head portion 114 are preferably made of a suitable metallic material such as stainless steel and the like. In order to avoid damage to the equipment and/or O-ring during its use, the tip end 122 of the head portion 114 is coated with a protective material such as Teflon. Since the use of the tool 110 of this embodiment is substantially identical to the prior embodiment, it will not be repeated.

Figure 6:
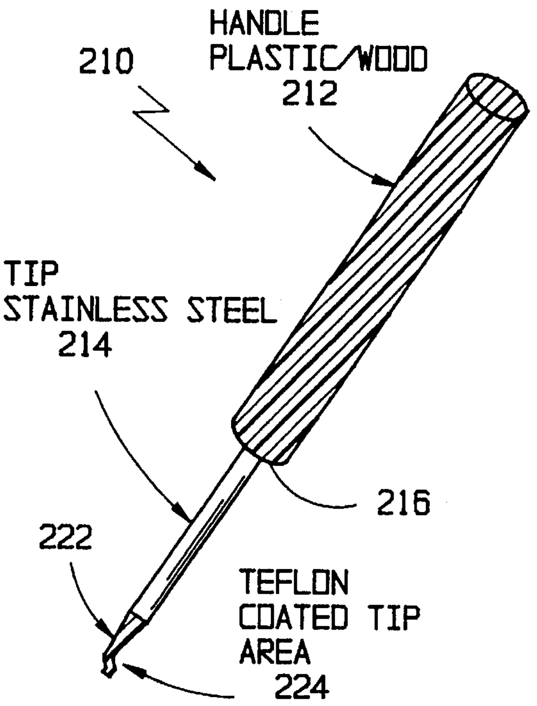
FIG. 6 is a perspective view of a third embodiment in accordance with the principles of the present invention.

FIG. 6 shows a third embodiment of the tool 210 of the present invention which is comprised of an elongated, cylindrically-shaped handle portion 212 and a head portion 214 which is fixedly secured at distal end 216 of the handle portion 212. The overall dimension of this third embodiment is again substantially the same as the prior embodiments of FIGS. 1 and 5. In particular, the handle portion 212 is about 3 inches in length and has a diameter of approximately ¼ inch. The handle portion 112 is preferably made of wood or a plastic material which facilitates gripping and handling by the user. The head portion 214 is about 2 inches in length from the distal end 216 to the tip end 222. The tip end 222 terminates in a substantially flat portion 224 which facilitates insertion of the tool underneath the O-ring to be removed.

It will be noted that the head portion 214 is preferably made of a suitable metallic material such as stainless steel and the like. In order to avoid damage to the equipment and/or O-ring during its use, the tip end 222 of the head portion 214 is again coated with a protective material such as Teflon. Since the use of the tool 210 of this embodiment is substantially identical to the prior embodiments of FIGS. 1 and 5, no further illustration is required.

Figure 7:
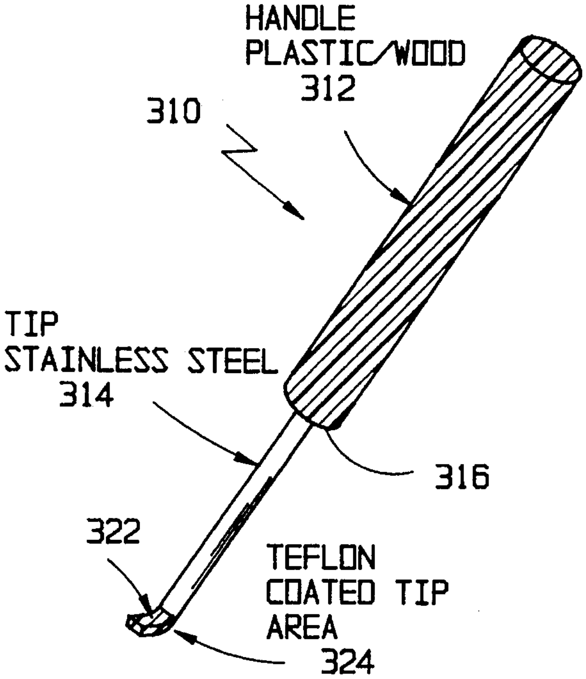
FIG. 7 is a perspective view of a fourth embodiment in accordance with the principles of the present invention.
Figure 8:
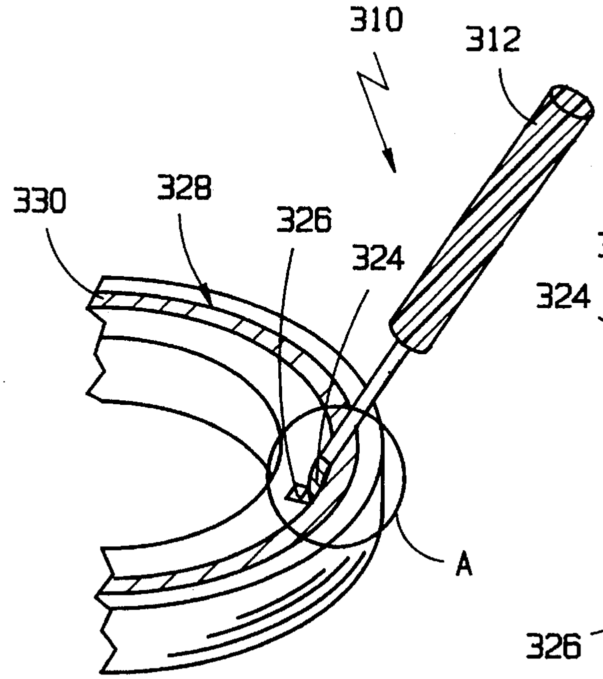
FIG. 8 is a fragmentary, diagrammatical view, illustrating the removal of an O-ring located within a groove with the tool of FIG. 7.
Figure 9:
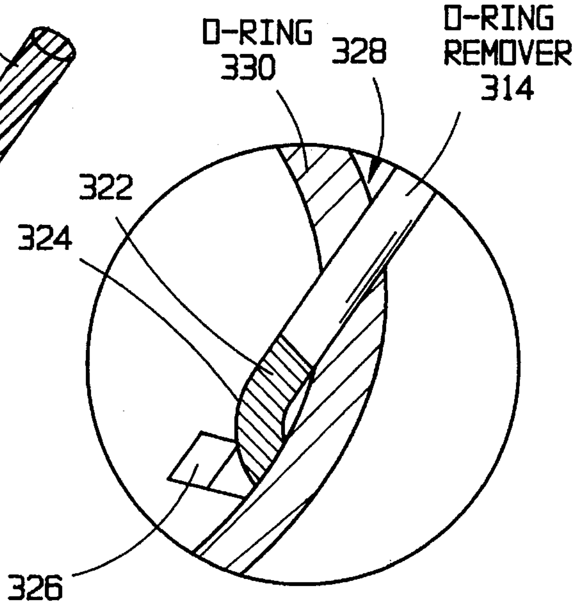
FIG. 9 is an enlarged view of the encircled area A of FIG. 7.

FIG. 7 shows a fourth embodiment of the tool 310 of the present invention which is comprised of an elongated, cylindrically-shaped handle portion 312 and a head portion 314 which is fixedly secured at distal end 316 of the handle portion 312. It can be seen that the tool 310 is substantially identical to the tool 210 of FIG. 6, except for the shape of the tip end 322. The tip end 322 of the fourth embodiment of FIG. 7 terminates in a 90° bent portion 324 which facilitates the insertion of the tool into a specially-formed recessed area disposed in a grooved surface containing the O-ring to be removed as illustrated in FIGS. 8 and 9.

Again, it will be noted that the handle portion 312 is preferably made of wood or a plastic material, and that the head portion 314 is preferably made of a suitable metallic material such as stainless steel or the like. As can be seen from FIGS. 8 and 9, the user can grip the handle portion 312 so as to insert the 90° bent portion 324 of the tip end 322 into a specially-formed recessed area 326 disposed in a grooved surface 328 containing the O-ring 330 to be removed. Then, the user can pry manually the O-ring 330 from the grooved surface 328 and lift the same upwardly in order to remove the O-ring.

From the foregoing detailed description, it can thus be seen that the present invention provides an improved tool for use in removing an O-ring from a grooved surface. The tool is formed of an elongated handle portion and a head portion terminating in a rounded tip portion. The tip portion is insertable into the grooved surface and underneath the O-ring seal member so as to pry manually and lift upwardly the same in order to remove the O-ring seal member.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A tool for use in removing an O-ring seal member from a grooved surface, comprising:

a flat, elongated handle portion (12) having a first end and a second end, said first end of said handle portion being of a sufficient length so as to be gripped by a user;

said handle portion being substantially rectangular in cross-section and being tapered inwardly from its first end to its second end;

a head portion (14) having a first end formed integrally with said second end of said handle portion and a second end terminating in a rounded tip portion (22);

said head portion being also tapered from its first end to its second end;

said first end of said head portion being joined to said second end of said handle portion at an angle of about 120° to 150°;

said tip portion being bent upwardly approximately 30° from said second end of said head portion; and said tip portion being insertable into a grooved surface and underneath the O-ring seal member so as to pry manually and lift upwardly the same in order to remove the O-ring seal member.

2. A tool as claimed in claim 1, wherein said handle portion has a length in the range of 2–6 inches and a thickness in the range of 0.125 to 0.25 inch.

3. A tool as claimed in claim 1, wherein said handle portion and said head portion are made of a low-weight plastic material formed by an injection molding process.

4. A tool as claimed in claim 1, wherein said first end of said handle portion includes an opening (18) formed therein to facilitate carrying the tool.

5. A tool as claimed in claim 2, wherein said head portion has a length in the range of 0.5 to 1.5 inches and has a thickness of 0.125 to 0.250 inch.

* * * * *